United States Patent [19]
Ochiai et al.

[11] Patent Number: 5,561,240
[45] Date of Patent: Oct. 1, 1996

[54] LEAK DETECTING APPARATUS USING COMPOUND TURBO-MOLECULAR PUMP

[75] Inventors: Eijiro Ochiai; Akio Umezawa, both of Chigasaki, Japan

[73] Assignee: Nihon Shinku Gijutsu Kabushiki Kaisha, Chigasaki, Japan

[21] Appl. No.: 471,527

[22] Filed: Jun. 6, 1995

[30] Foreign Application Priority Data

Jun. 29, 1994 [JP] Japan .................. 6-148228

[51] Int. Cl.⁶ .................................................. G01M 3/20
[52] U.S. Cl. ............................................ 73/40.7; 73/40
[58] Field of Search ................................... 73/40.7, 40

[56] References Cited

U.S. PATENT DOCUMENTS

| | | | |
|---|---|---|---|
| 4,472,962 | 9/1984 | Mennenga | 73/40.7 |
| 4,487,058 | 12/1984 | Mennenga | 73/40.7 |
| 4,492,110 | 1/1985 | Bergquist | 73/40.7 |
| 4,499,752 | 2/1985 | Fruzzetti et al. | 73/40.7 |
| 4,550,593 | 11/1985 | Reich | 73/40.7 |
| 4,735,084 | 4/1988 | Fruzzetti | 73/40.7 |
| 4,773,256 | 9/1988 | Saulgeot | 73/40.7 |
| 4,776,207 | 10/1988 | Holme | 73/40.7 |
| 4,779,449 | 10/1988 | Bley et al. | 73/40.7 |
| 4,919,599 | 4/1990 | Reich et al. | 417/423.4 |
| 5,297,422 | 3/1994 | Baret | 73/40.7 |
| 5,317,900 | 6/1994 | Bergquist | 73/40.7 |

*Primary Examiner*—Thomas P. Noland
*Assistant Examiner*—J. David Wiggins
*Attorney, Agent, or Firm*—Armstrong, Westerman, Hattori, McLeland & Naughton

[57] ABSTRACT

A leak detecting apparatus using a compound turbo-molecular pump has an analyzer tube, an auxiliary vacuum pump such as a rotary pump connected to the analyzer tube by means of a passage with a compound turbo-molecular pump and a fore valve in between. An exhaust passage extends from a test port to be connected to an object of inspection. The exhaust passage is branched into a plurality of branched passages and each of the branched passages is connected to a position of different compression ratio of the compound turbo-molecular pump. A gate valve is disposed in each of the branched passages. There is connected to the exhaust passage a vacuum gauge which is in communication with each of the gate valves via a controller such that the gate valves are sequentially opened and closed by a signal from the controller in accordance with a change in pressure to be detected by the vacuum gauge.

4 Claims, 10 Drawing Sheets

FIG. 6
FIG. 6A
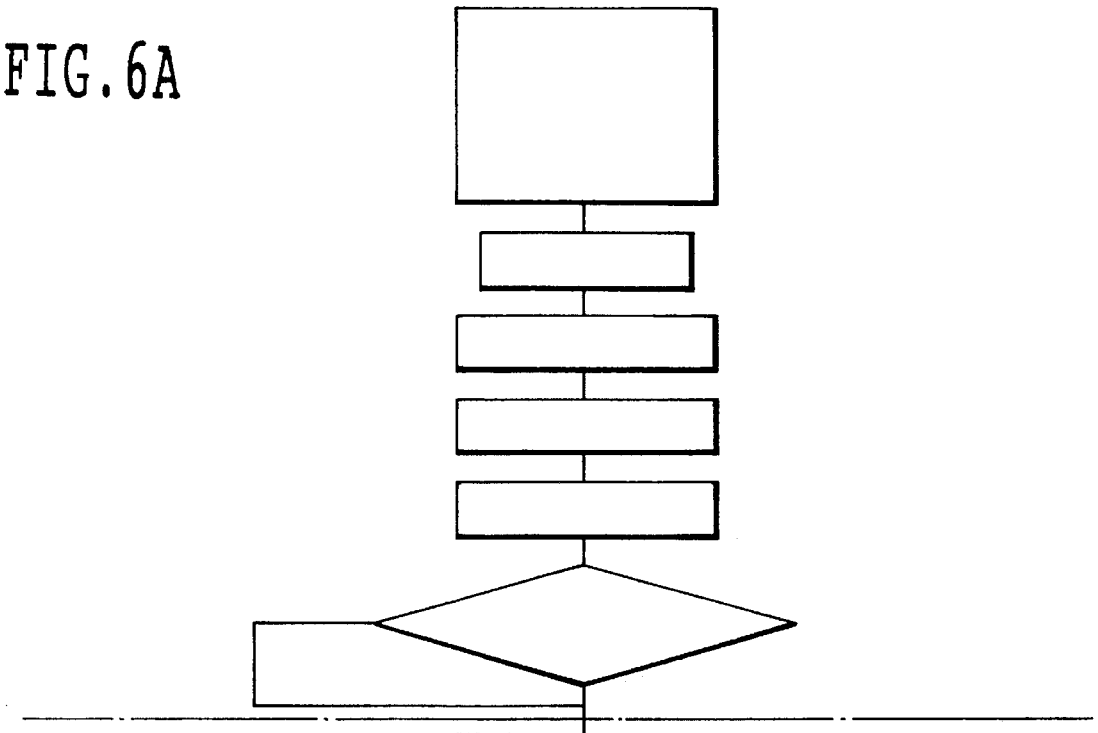
FIG. 6B
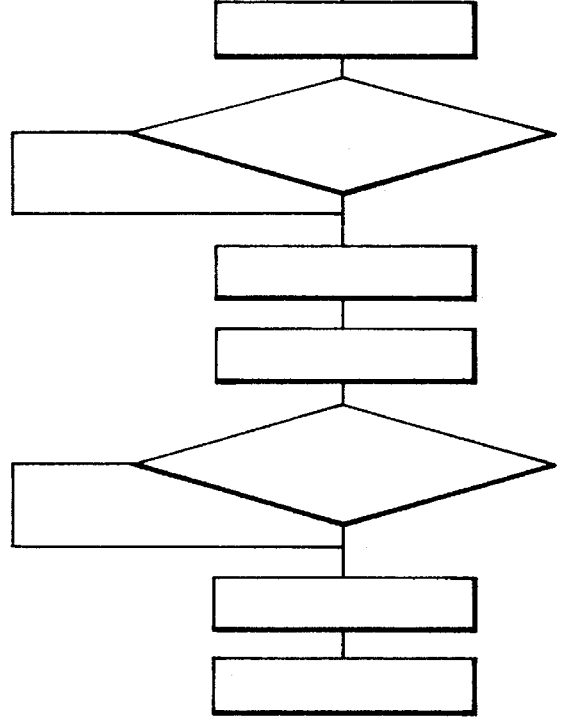

5,561,240

LEAK DETECTING APPARATUS USING COMPOUND TURBO-MOLECULAR PUMP

BACKGROUND OF THE INVENTION

1. Field of the Invention

The present invention relates to a leak detecting apparatus using a compound turbo-molecular pump. The apparatus is used for detecting a gas leakage of equipment requiring gastightness such as a compressor, a condenser to be used in a refrigerator or the like. In the present invention, the term "compound turbo-molecular pump" means a pump which is defined as a combination of a turbo molecular pump and a drag pump (or a turbo molecular pump or a screw pump in place of the drag pump).

2. Description of Related Art

Conventionally, the leakage of a gas in an object of inspection (or an object to be inspected) has been detected in the following manner. Namely, the object of inspection such as a compressor or the like is placed in a helium gas atmosphere or helium gas is blown onto it. The inside of the object of inspection is connected to a mass analyzing (or mass spectrometer) type of leak detecting apparatus as shown in FIGS. 1 and 2. Helium gas leaking from a leaking point into the inside of the object of inspection is thereby detected. In the leak detecting apparatus shown in FIG. 1, which is of a direct introduction type, when there is a leakage in the object "a" of inspection, the helium gas leaked into the object "a" of inspection is discharged outside from a test port b via a gate valve (or a shutoff valve) c, an analyzer tube d, a turbo molecular pump e, and an auxiliary vacuum pump f, so that the helium gas is detected in the analyzer tube d. In this apparatus, since the analyzer tube d is located within the discharge passage through which the helium gas introduced into the test port b is discharged, a high detecting sensitivity can be obtained and the reaction speed to the helium gas is quick.

On the other hand, the leak detecting apparatus shown in FIG. 2, which is of a back-diffusion type, utilizes a molecular movement of the helium gas. The helium gas leaked into the inside of the object "a" of inspection is discharged from a test port b into a roughening vacuum valve g and an auxiliary vacuum pump f. On its way, the gas is partly back-diffused to an analyzer tube d via a turbo molecular pump e, and is mass-analyzed in the analyzer tube d (or mass spectrometry takes place in the analyzer tube d). The above-described back-diffusion is a phenomenon which occurs when the compression ratio of the turbo molecular pump itself is small relative to a small, light molecule such as of helium gas. In this apparatus, since the measurement is possible if the exhausting or evacuating can be made down to an internal pressure of the object "a" of inspection of about 100 Pa, there is an advantage in that the time for rough-exhausting before starting the leak detection may be short.

In the apparatus of direct introduction type as shown in FIG. 1, the pressure ($10^{-3}$ Pa) inside the analyzer tube d required for the mass spectrometry becomes equal to the internal pressure of the object "a" of inspection. Therefore, it takes much time before the pressure inside the object "a" of inspection attains a value that fits for inspection at d. It is therefore not suitable for the leak detection of an object of a large volume. On the other hand, the apparatus of back-diffusion type as shown in FIG. 2 requires a shorter time in starting the leak detection. It has, however, a disadvantage in that, due to the characteristics in the exhausting or evacuating system, the detecting sensitivity and the reaction speed are inferior to those of the apparatus of direct introduction type. These conventional apparatuses thus have both advantages and disadvantages and it is left to the experience of an operator to choose which of the direct introduction type and the back-diffusion type systems is to be used for the leak detection. It follows that an adequate selection cannot be made by an operator without an experience in the problems normally encountered in the leak detection of various objects of inspection.

In view of the above disadvantages, the present invention has an object of providing a leak detecting apparatus which can start the leak detection of an object of inspection in a shorter time and which is superior in the detecting sensitivity and the reaction speed and is easier to operate.

SUMMARY OF THE INVENTION

In order to attain the above and other objects, the present invention is a leak detecting apparatus using a compound turbo-molecular pump comprising: an analyzer tube; an auxiliary vacuum pump such as a rotary pump connected to the analyzer tube by means of a passage with a compound turbo-molecular pump and a fore valve (or an auxiliary valve) in between; and an exhaust passage extending from a test port to be connected to an object of inspection; wherein the exhaust passage is branched into a plurality of branched passages, each of the branched passages being connected to a position of different compression ratio of the compound turbo-molecular pump; and wherein a gate valve is disposed in each of the branched passages.

Preferably, the apparatus is further provided with a vacuum gauge connected to the exhaust passage, and the vacuum gauge is communicated with each of the gate valves via a controller. If the gate valves are then sequentially opened and closed by a signal from the controller in accordance with a change in pressure to be detected by the vacuum gauge, an automatic operation becomes possible. The above-described object can also be attained by a leak detecting apparatus using a compound turbo-molecular pump comprising: an analyzer tube; an auxiliary vacuum pump (or an auxiliary pump) connected to the analyzer tube by means of a passage via a compound turbo-molecular pump and a fore valve in between, the auxiliary vacuum pump being capable of changeover in rotation speed; an exhaust passage extending from a test port to be connected to an object of inspection; and a vacuum gauge connected to the exhaust passage; wherein the passage is branched into three passages of a first branched passage, a second branched passage and a third branched passage; a gate valve which is disposed in each of the branched passages; wherein the first branched passage is connected via the fore valve to a position of low compression ratio of the compound turbo-molecular pump, the third branched passage is connected to a position of largest compression ratio of the compound turbo-molecular pump, the second branched passage is connected to a position of an intermediate compression ratio such that only the third branched passage is opened when a pressure detected by the vacuum gauge is in a high range, that only the second branched passage is opened when the pressure is in an intermediate range, and that only the first branched passage is opened when the pressure is in a low range.

In an initial stage in which each of the valves is closed, the fore valve and a vent valve are opened, and the auxiliary vacuum pump and the compound turbo-molecular pump are operated, the object of inspection which is positioned in a helium gas atmosphere is connected to the test port, thereby, starting the leak detection of the object of inspection. First, the fore valve and the vent valve are closed and then the gate valve in the branched passage which is connected to the position of largest compression ratio of the compound turbo-molecular pump (i.e., the third branched passage) is opened. By these operations, the branched passage and the object of inspection are exhausted by the auxiliary vacuum pump. When the pressure has reached 1000 Pa, for example, that is a pressure that can maintain a pressure of $10^{-3}$ Pa at which mass analyzing or mass spectrometry in the analyzer tube can be made, the fore valve is opened to thereby carry out a gross leak test. In this test, the gas inside the object of inspection is mostly led from the branched passage to the auxiliary vacuum pump. However, if there is a large leak in the object of inspection, thereby causing an intrusion of a large amount of helium gas thereinto, the helium molecules in the leaked gas are back-diffused in the direction opposite to that of exhausting of the compound turbo-molecular pump, thereby being detected in the analyzer tube.

If there is little or no leak in the object of inspection, the amount of helium in the gas is also small in amount and, consequently, the leak cannot be determined or judged in this gross leak test. In such a case, the exhausting of the auxiliary vacuum pump is continued to lower the pressure inside the branched passage and the pressure inside the object of inspection down to a pressure that is different by one decimal, e.g., to 100 Pa. The gate valve in the branched passage that was in service up to that time (i.e., in the third branched passage) is closed, and the gate valve connected to a position which is next larger in the compression ratio (i.e., in the second branched passage) is opened to carry out a middle leak test. At this time, since the object of inspection and the branched passage are low in pressure, the ratio of helium gas that leaked thereinto has become large. It is therefore easy to detect the helium gas molecules by the analyzer tube by the back-diffusion in the compound turbo-molecular pump. Further, since the exhausting is carried out by utilizing part of the compound turbo-molecular pump of high exhausting speed, the middle leak test can be finished in a short time.

The confirmation that there is very little or no leak is made in a fine leak test, i.e., by lowering the pressure inside the branched passage and the object of inspection further down to a pressure that is different by one decimal, i.e., to 10 Pa, by closing the gate valve in the branched passage that was in service up to that time (i.e., in the second branched passage), and by opening the gate valve in the branched passage that is connected to a position of a small compression ratio of the compound turbo-molecular pump (i.e., in the first branched passage). At this time, since the ratio of helium gas has further been increased, even a very small leak would be able to be found out. Therefore, when nothing can be detected in the analyzer tube, it can be judged that there is no leak in the object of inspection. At this time, too, since the exhausting is made by utilizing part of the function of the compound turbo-molecular pump of higher exhausting speed, the fine leak test can be made in a short time.

By alternately connecting each of the branched passages, it is possible to detect the leak even when the pressure in the fore side of the compound turbo-molecular pump is relatively high. It becomes thus not necessary, unlike in the conventional apparatus, to carry out the leak detection after having exhausted the pressure of the fore side down to a predetermined low pressure. The time of starting the leak detection of an object of inspection of a large volume can therefore be shortened. The detection sensitivity and the reaction speed can be improved by the operation of the gate valves, thereby enabling a leak detection of high accuracy. Further, since the control of the gate valves can be automatically made in interlocking with the vacuum gauge, the workability is improved and the high degree of previous operator experience in the leak detection in various kinds of objects of inspection becomes needless.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 3:
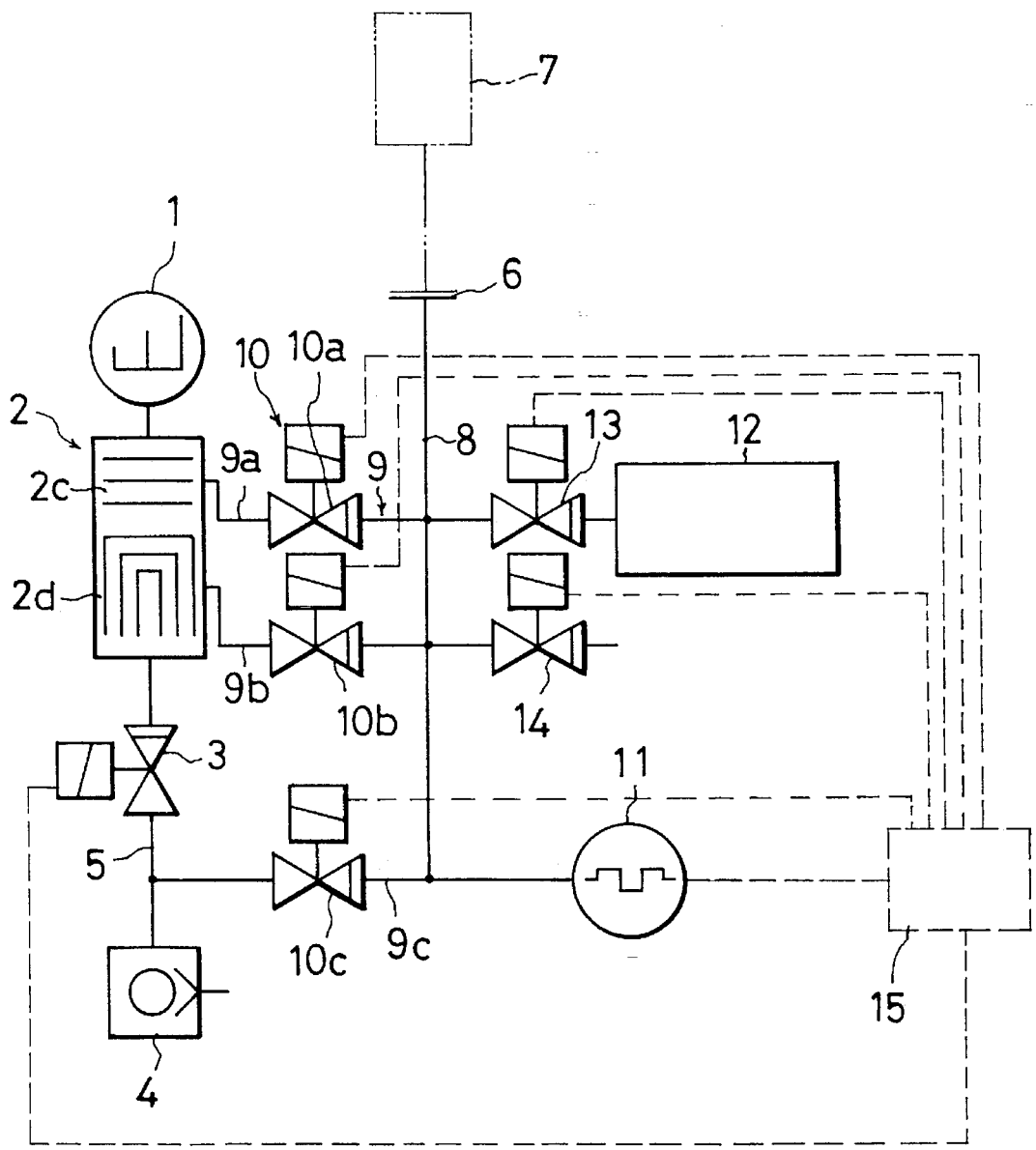
FIG. 3 is a diagram showing one embodying example of a leak detecting apparatus according to the present invention.
Figure 4:
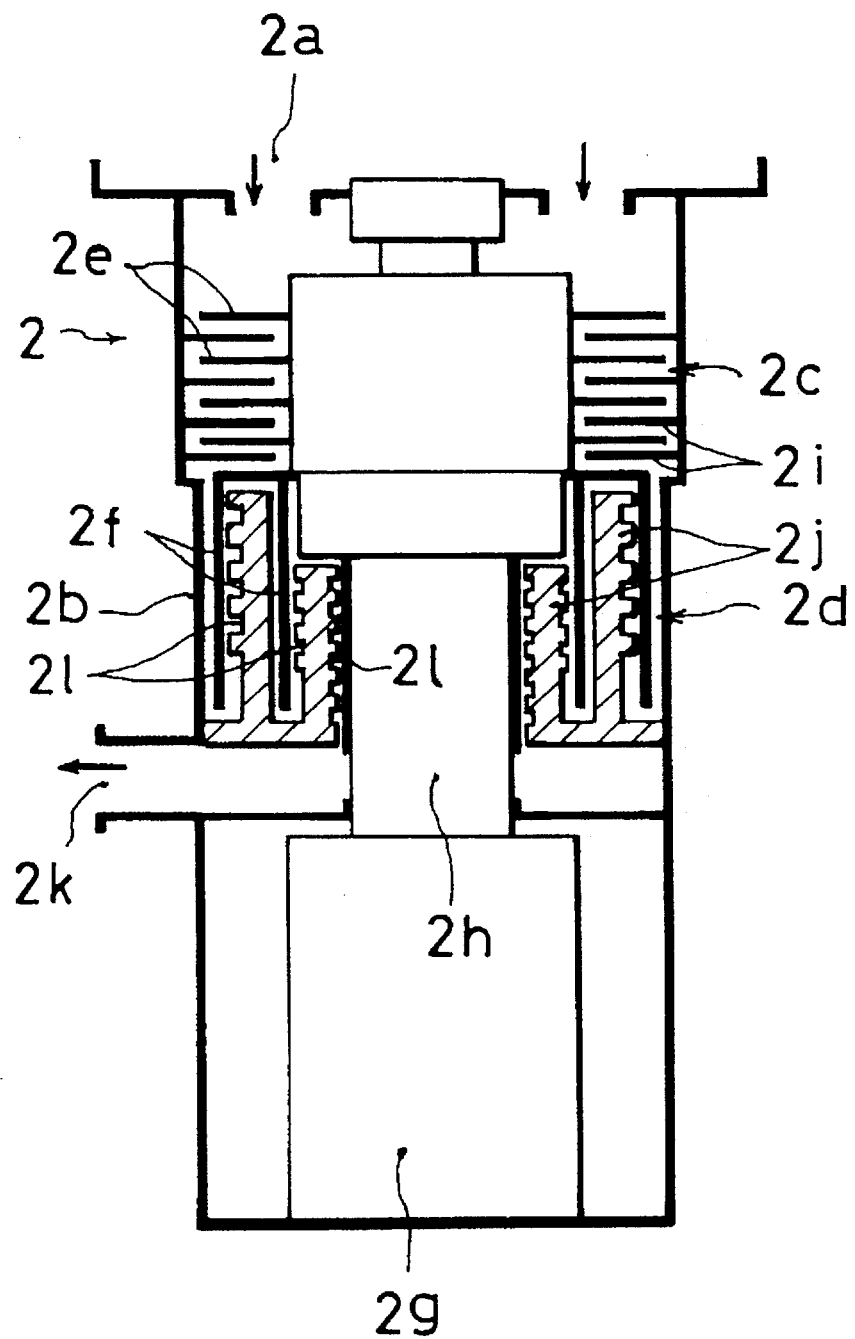
FIG. 4 is a diagrammatic sectional view showing one embodying example of a compound turbo-molecular pump of FIG. 3.

An explanation will now be made about an embodying example of the present invention with reference to the accompanying drawings. In FIG. 3, numeral 1 denotes an analyzer tube for mass analyzing or mass spectrometry. In order to exhaust or evacuate the inside of the analyzer tube 1 to a high vacuum of $10^{-3}$ Pa, an auxiliary vacuum pump 4 such as a rotary pump or the like is connected to the analyzer tube 1 by means of a main passage 5 via a compound turbo-molecular pump 2 and a fore valve (or an auxiliary valve) 3 which are both disposed on the fore side of the analyzer tube 1. This compound turbo-molecular pump 2 is of a conventional one and has the following construction. Namely, as shown in FIG. 4, inside a pump casing 2b which is provided with a connection port 2a to the analyzer tube 1 and a connection port 2k to the main passage 5, there are disposed a turbo molecular pump portion 2c and a drag pump portion 2d. A rotor 2e and a rotor 2f which constitute respective pump portions are mounted on a common rotary shaft 2h to be rotated by an electric motor 2g. A stator 2i and a stator 2j which constitute the respective pump portions are mounted inside the casing 2b. It is thus so arranged that the gas is exhausted from the connection port 2a to the connection port 2k by the operation of the pump portions as a result of the rotation of the electric motor 2g. The drag pump portion 2d is constituted by a rotor 2f which is made up of a three-fold cylindrical body, and two stators 2j which have spiral grooves or screws 21 on peripheral surfaces interposed between each of the rotors 2f. The gas to be exhausted or evacuated by the turbo molecular pump portion 2c is exhausted to the main passage 5 by means of the spiral grooves 21 of the drag pump portion 2d. The compound turbo-molecular pump 2 may be of such a construction that, instead of the drag pump portion, there is provided a turbo molecular pump portion or a screw pump portion.

Numeral 6 denotes a test port to which is connected an inside of an object of inspection 7 of an equipment requiring gastightness, such as a compressor and a condenser of a refrigerator or the like. An exhaust passage 8 which extends from this test port 6 is branched and the branched passages 9 are connected to respective portions of varying compression ratios of the compound turbo-molecular pump 2 via gate valves (or shutoff valves) 10. In the illustrated example, the branched passages 9 are branched into three, i.e., a first branched passage through a third branched passage 9a, 9b, 9c. First through third gate valves 10a, 10b, 10c are respectively interposed in the branched passages 9a, 9b, 9c. The first branched passage 9a is connected to such an intermediate position between the compound molecular pump portion 2c and the drag pump portion 2d as will be able to obtain a compression ratio of 2500. The second branched passage 9b is connected to such an intermediate position of the drag pump portion 2d as will be able to obtain a compression ratio of 15000. The third branched passage 9c is connected to such a position as will be able to obtain a compression ratio of 150000.

Figure 1:
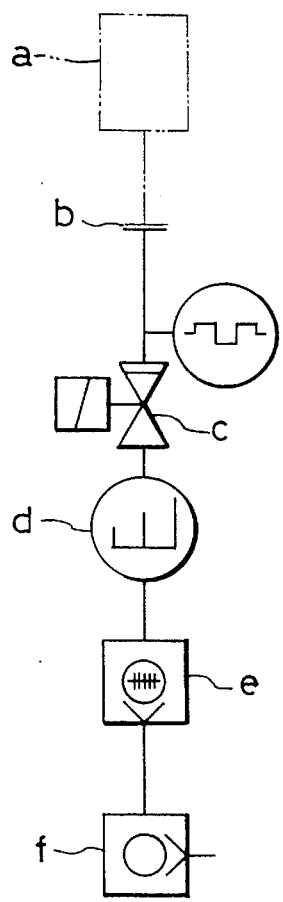
FIG. 1 is a diagram showing a conventional leak detecting apparatus of direct introduction type.
Figure 2:
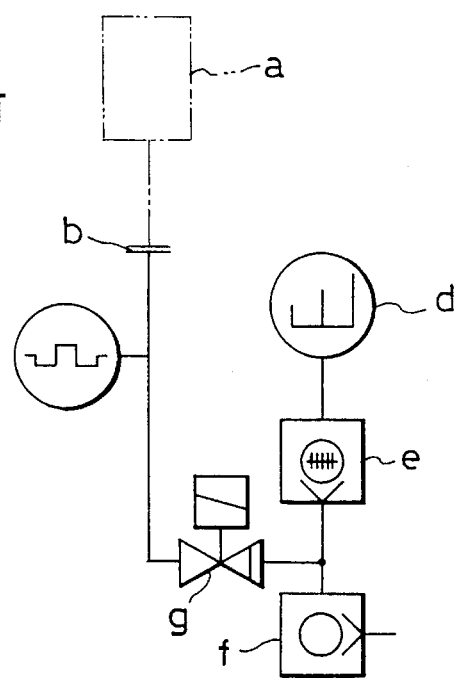
FIG. 2 is a diagram showing a conventional leak detection apparatus of back-diffusion type.

The analyzer tube 1 cannot make an accurate analysis due to the relationship of a mean free path unless the internal pressure is $10^{-3}$ Pa or below. However, by connecting the branched passages to the above-described positions of the compound turbo-molecular pump 2, the internal pressure in the analyzer tube 1 can be maintained to $10^{-3}$ Pa even if the maximum pressure in the first branched passage 9a is 25 Pa, the maximum pressure in the second branched passage 9b is 150 Pa, and the maximum pressure in the third branched passage 9c is 1500 Pa. In order to maintain the pressure inside the analyzer tube 1 to $10^{-3}$ Pa in the conventional example as shown in FIG. 2, it is necessary to make the maximum pressure on the back pressure side of the turbo molecular pump to about 100 Pa. In this invention, on the contrary, the leak detection can be made by the above-described connection because a counter flow can be obtained even in a pressure that is higher by about one decimal. Further, in the present invention, the compression ratio relative to the helium gas becomes 25 in the first branched passage 9a, 150 in the second branched passage 9b, and 1500 in the third branched passage 9c. Due to the differences in the compression ratios, the counter flow characteristics in each of the branched passages vary and, in the first branched passage 9a with a smaller compression ratio, there can be obtained a detection sensitivity which is approximately similar to that in the direct introduction type as shown in FIG. 1. In the actual leak detection, there can be obtained a detection sensitivity of $10^{-11}$–$10^{-7}$ Pa.m³/sec in the first branched passage 9a, a detection sensitivity of $10^{-10}$–$10^{-6}$ Pa.m³/sec in the second branched passage 9b, and a detection sensitivity of $10^{-8}$–$10^{-4}$ Pa.m³/sec in the third branched passage 9c. A wide range of leak detection in $10^{-11}$ 14 $10^{-4}$ Pa.m³/sec is thus possible.

Figure 5:
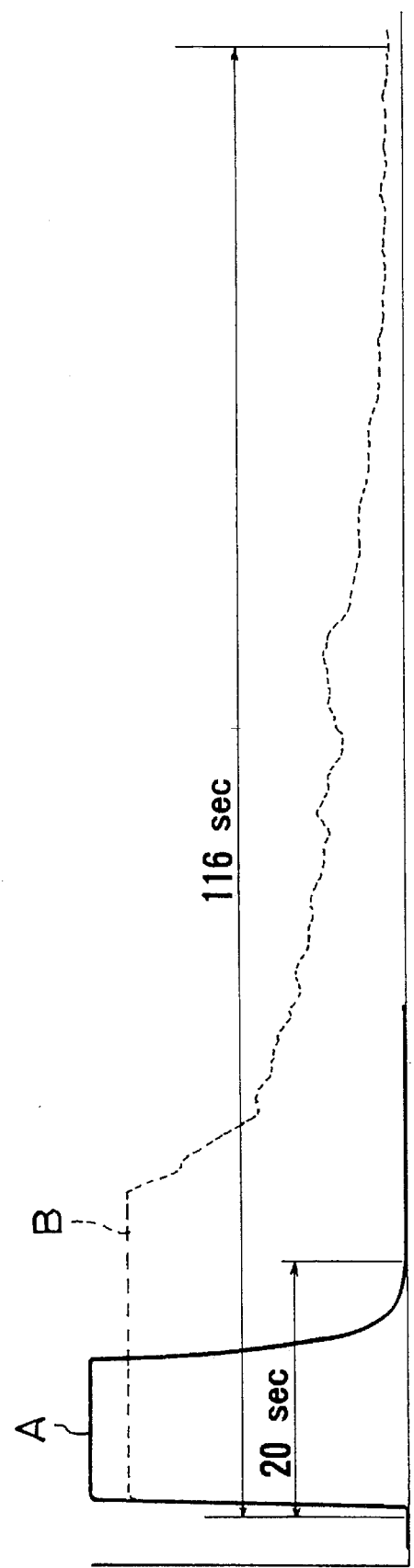
FIG. 5 is a diagram showing the cleaning up time of the apparatus in FIG. 3.

The exhaust or evacuating speed in the test port 6 in the back-diffusion type as shown in FIG. 2 depends on the exhaust speed of the auxiliary vacuum pump such as a rotary pump. Therefore, the exhaust speed is about 5 l/min. On the contrary, since the first and the second branched passages 9a, 9b utilize the function of the compound turbo-molecular pump 2, i.e., the function of the drag pump portion, about several tens times of the exhaust speed of 5 l/sec and 3 l/sec can respectively be obtained in the first and the second branched passages 9a, 9b. This results in an improvement in the effective exhaust speed by the order of several times that of the conventional one. Therefore, as shown by curve A in FIG. 5, it is possible to shorten the time for cleaning up to about 20 seconds. This is a large reduction in the cleaning-up time from the conventional time of 116 seconds as shown by curve B. This cleaning-up time was measured by first introducing helium gas of $1 \times 10^{-2}$ Pa.m³/sec from the test port 6 and then, after stopping the introduction, by measuring the time until the residue of helium gas ceases to exist.

To the exhaust passage 8 there are connected a vacuum gauge 11 such as a Pirani gauge to detect the pressure, a reference (or standard) leak 12 with a quartz glass via a gate valve 13, and a vent valve 14. The vacuum gauge 11 is arranged such that a controller 15 is provided to control the opening and closing of the first through the third gate valves based on the pressure to be detected by the vacuum gauge 11. To the controller 15 there are also electrically connected the fore valve 3, the gate valve 13, and the vent valve 14 so that they can be controlled by the controller 15 for opening and closing.

Figure 6A:
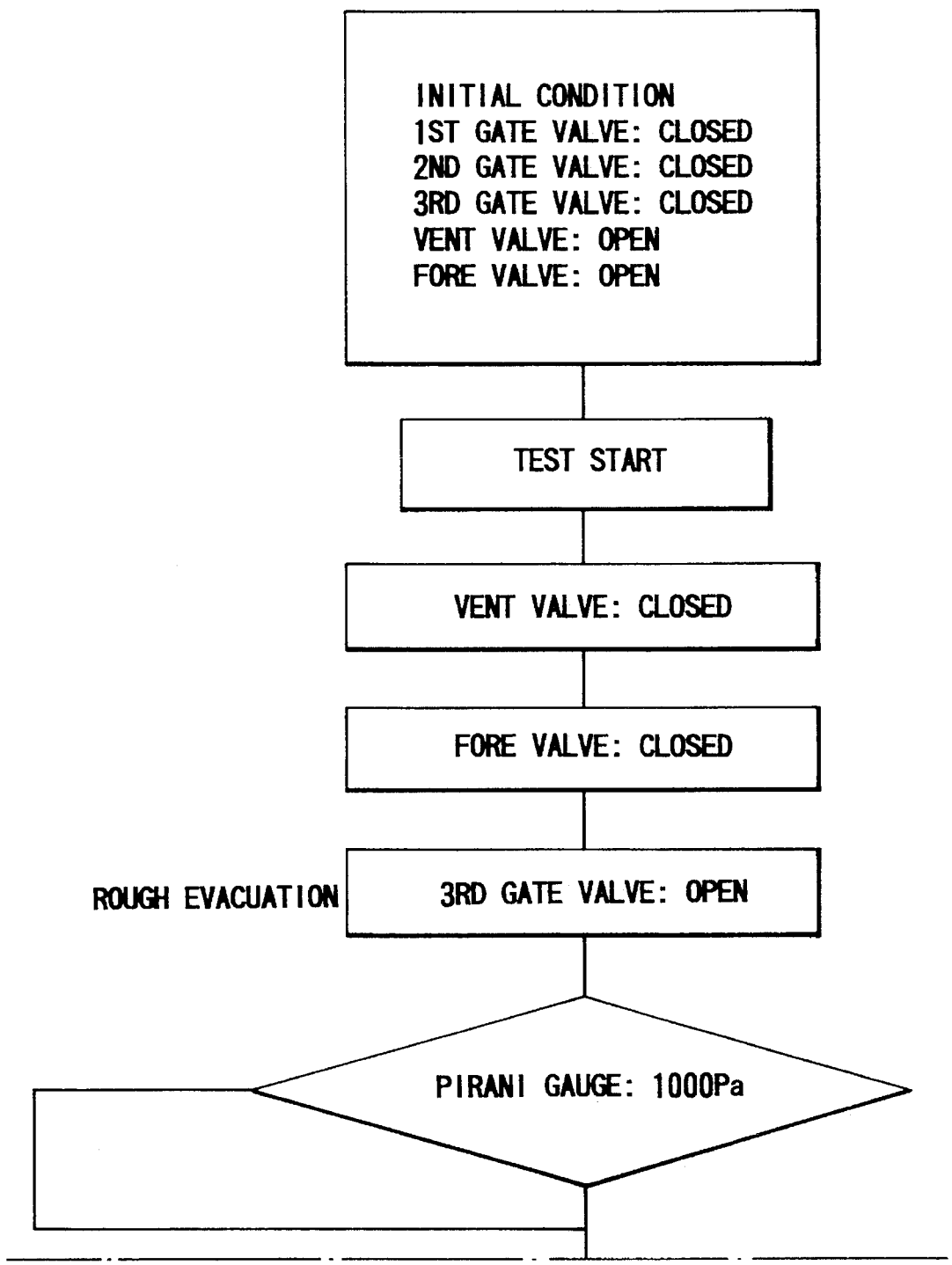
FIG. 6, which is shown by dividing it into two of FIG. 6A and FIG. 6B to show in detail, is a flow chart showing the operation of the apparatus in FIG. 3.
Figure 6B:
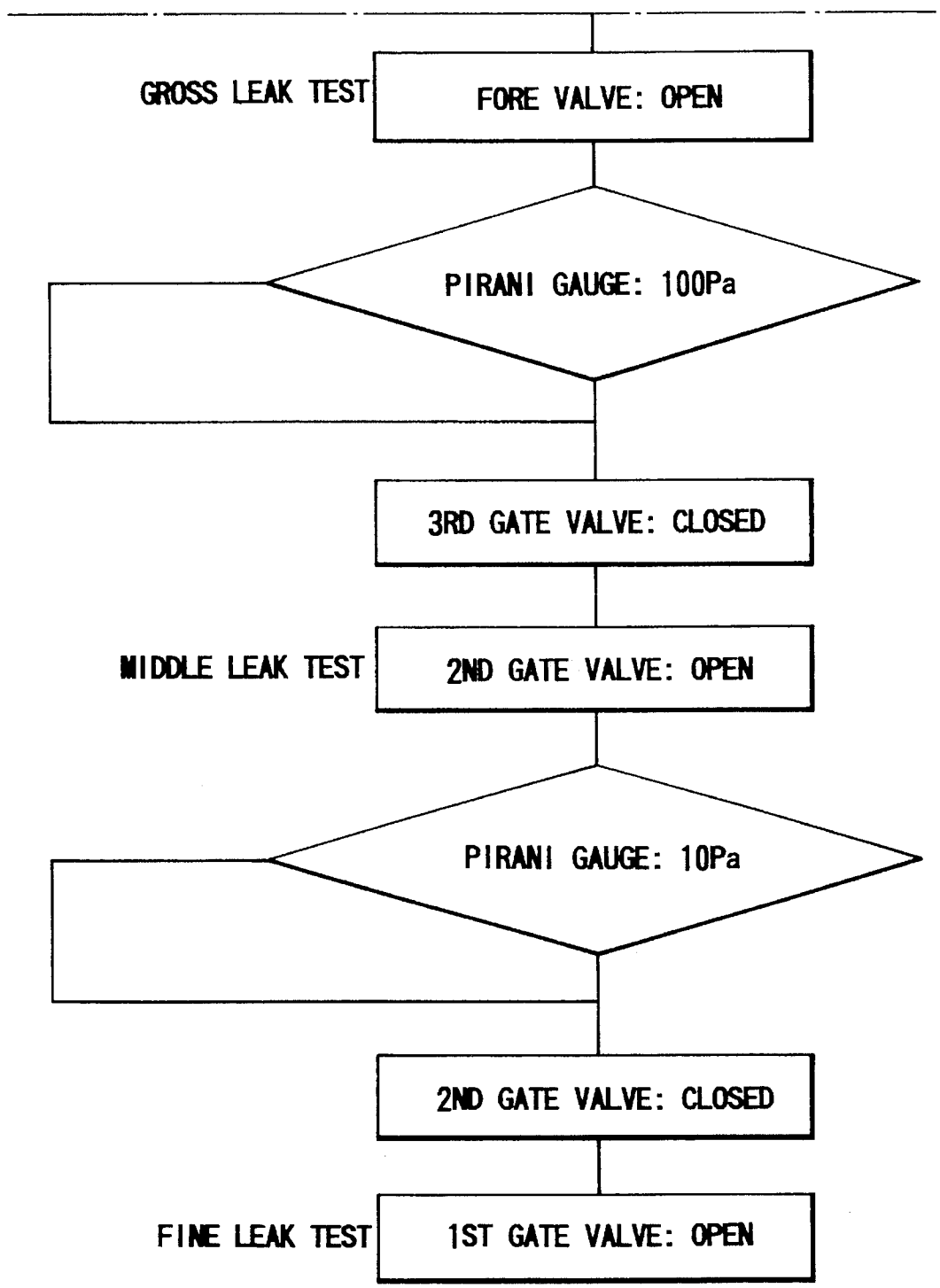

The operation of the embodying example will now be explained with reference to the flow chart shown in FIG. 6 which is shown by dividing it into two of FIG. 6A and FIG. 6B. In an initial condition, the object of inspection 7 is attached to the test port 6 and the compound turbo-molecular pump 2 and the auxiliary vacuum pump 4 are put into an operating condition. The fore valve 3 and the vent valve 14 are opened and the other valves are closed. When a signal to show the starting of leak detection is outputted from the controller 15, the fore valve 3 and the vent valve 14 are closed and the third gate valve 10c is opened. The inside of the object of inspection 7 is started to be roughly evacuated or exhausted by the auxiliary vacuum pump 4. When the indication of the Pirani gauge 11 for pressure monitoring has reached 1000 Pa, the fore valve 3 is opened, thereby starting a gross leak test. In this test, the gas inside the object of inspection 7 is exhausted outside through the third branch passage 9c and the auxiliary vacuum pump 4. When there is a large amount of leak in the object of inspection 7 and consequently the ratio of helium gas in the leaked gas is large, part of the helium gas is back-diffused via the fore valve 3 and the compound turbo-molecular pump 2 and is arrested in the analyzer tube 1. The presence of a leak is thus confirmed.. When a leak is not detected, the testing is continued. When the indication of the Pirani gauge 11 has reached 100 Pa, the controller 15 closes the third gate valve 10c and opens the second gate valve 10b. According to this operation, the gas inside the object of inspection 7 is exhausted outside from the second branched passage 9b via the drag pump portion 2d of the compound turbo-molecular pump 2, the fore valve 3, and the auxiliary vacuum pump 4, thereby carrying out a middle leak test. In this condition, when there is a leak in the object of inspection 7, the ratio of helium gas in the leaked gas becomes large. Therefore, the helium molecules are likely to be back-diffused into the analyzer tube 1. It follows that the presence of a leak can be detected even if it is not a large amount of leak. Further, since part of the function of the compound turbo-molecular pump 2 which is large in exhaust speed is utilized, a low-pressure condition can rapidly be attained. When a leak cannot be detected by the middle leak test, the testing is further continued as it is. When the indication of the Pirani gauge 11 has reached 10 Pa, the controller 15 closes the second gate valve 10b and opens the first gate valve 10a. According to this operation, the gas inside the object of inspection 7 is exhausted outside at a high speed from the first branched passage 9a via the turbo pump portion 2c, the fore valve 3 and the auxiliary vacuum pump 4, thereby carrying out a fine leak test. In this case, the inside of the object of inspection 7 is in the low-pressure condition which is equivalent to that of the direct introduction type as shown in FIG. 1. Therefore, even a slight leak of the object of inspection 7, i.e., an intrusion thereinto of a very small amount of helium gas can be detected. Even if the volume of the object of inspection 7 may be large, or even if the gas to be emitted from the object of inspection 7 may be large, the branched passages are automatically selected by the indication of the Pirani gauge 11 which is measuring the pressure of the exhaust passage 8 that extends from the test port 6. As a result, the leak test can be carried out with a most suitable passage, without being influenced by the presence or absence of experience of the operator of the detecting apparatus. The operation of the detecting apparatus therefore becomes easy.

Figure 7:
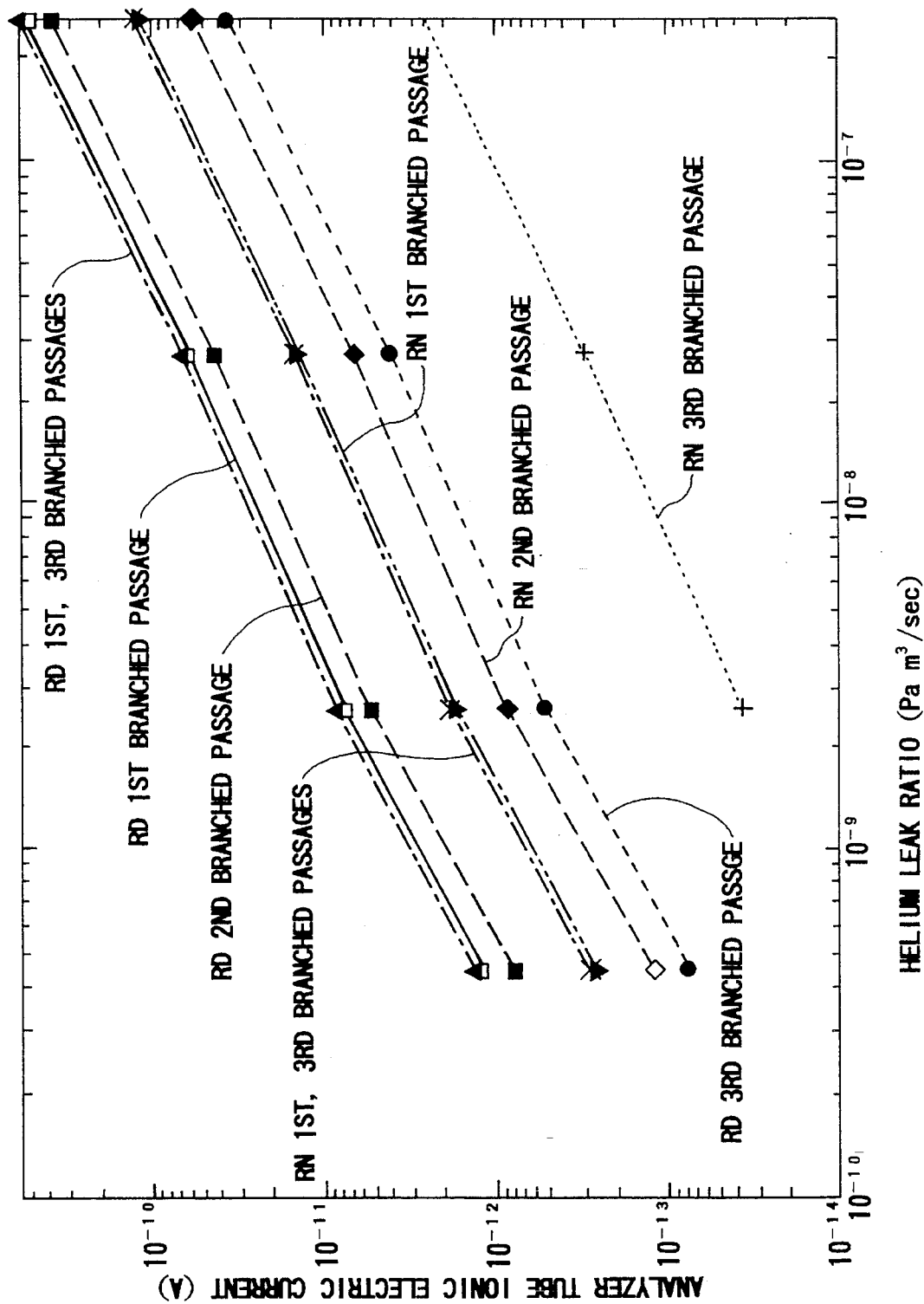
FIG. 7 is a diagram Showing the relation between the rotation speed of the compound turbo-molecular pump and the detecting sensitivity of each branched passage.

It is possible to change the rotation speed of the compound turbo-molecular pump 2 shown in FIG. 3 in two stages, e.g., of a high speed and a low speed. In such an arrangement, six kinds of compression ratios can be obtained in the three branched passages, with the result that a further extensive leak detection can be carried out. In concrete, the rotation speed of the compound turbo-molecular pump 2 was changed to a normal one (RN) of 90000 rpm and a reduced one (RD) which is 40% less than the normal one. In each of the above rotation speeds, $10^{-7}$– $10^{-10}$ Pa.m$^3$/sec of helium gas was caused to flow from the reference leak 12 to check the detection sensitivity in the analyzer tube 1 at each of the branched passages. As shown in FIG. 7, the detection sensitivity corresponding to the reference leak amount was obtained in each of the branched passages. It can thus be seen that the linearity is secured and that there is a difference in the range of the detection sensitivity among the branched passages.

Figure 8:
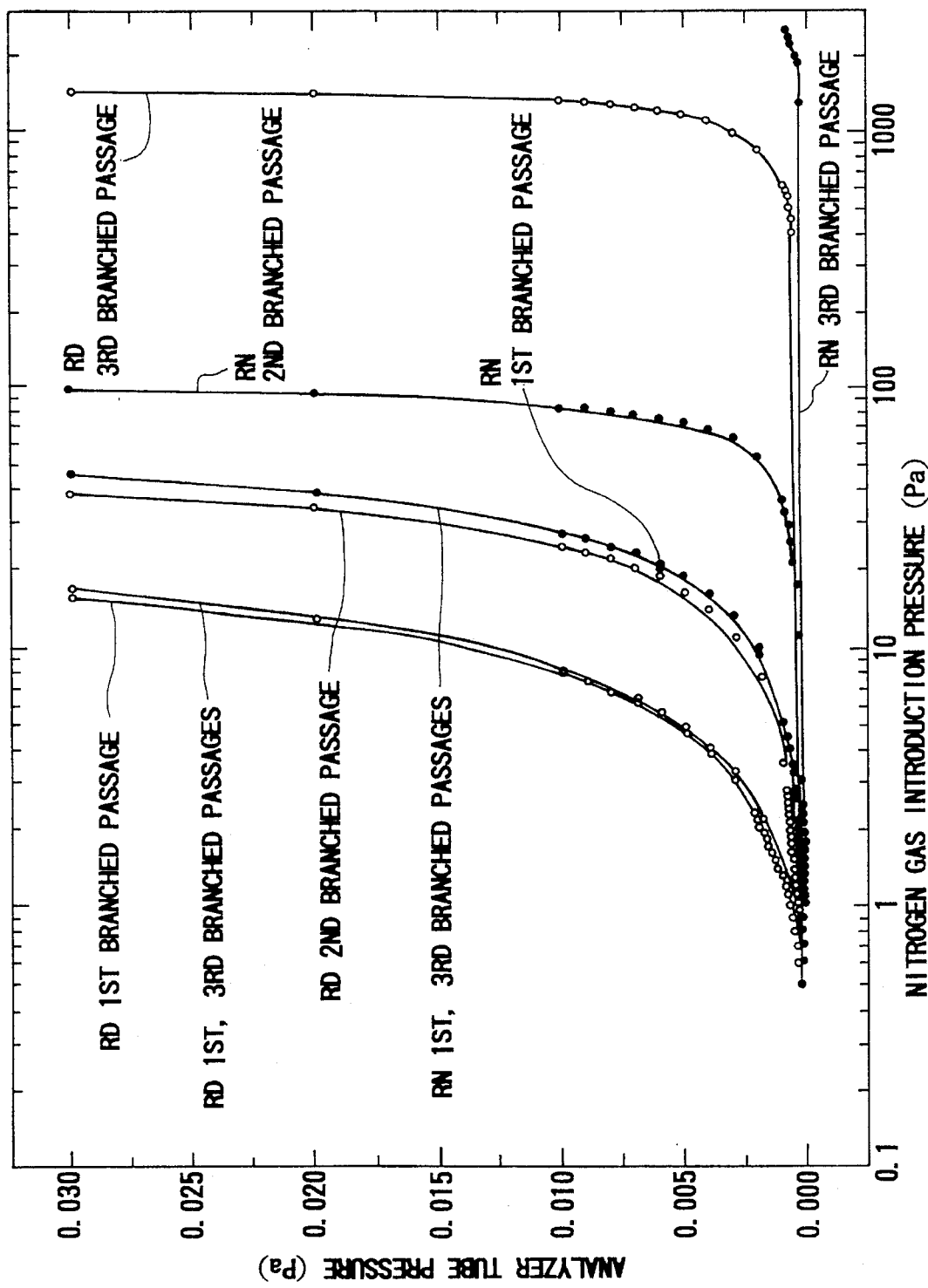
FIG. 8 is a diagram showing the relation between the rotation speed of the compound turbo-molecular pump and the compression; ratio at connecting portion of each branched passage.

Further, there was checked a compression ratio of nitrogen gas in the port at which each of the branched passages is connected to the compound turbo-molecular pump at the time of normal rotation speed (RN) and of 40% reduced rotation speed (RD), and the results are shown in FIG. 8. At the connection port 2a at which the compound turbo-molecular pump 2 is connected to the analyzer tube 1, a pressure of $10^{-3}$ Pa is required. A transition point of each curve in FIG. 8 becomes a limit value of pressure in each of the branched passages. According to these curves, it can be seen that the third branched passage in normal rotation speed can be connected up to a pressure of 1000 Pa.

Figure 9:
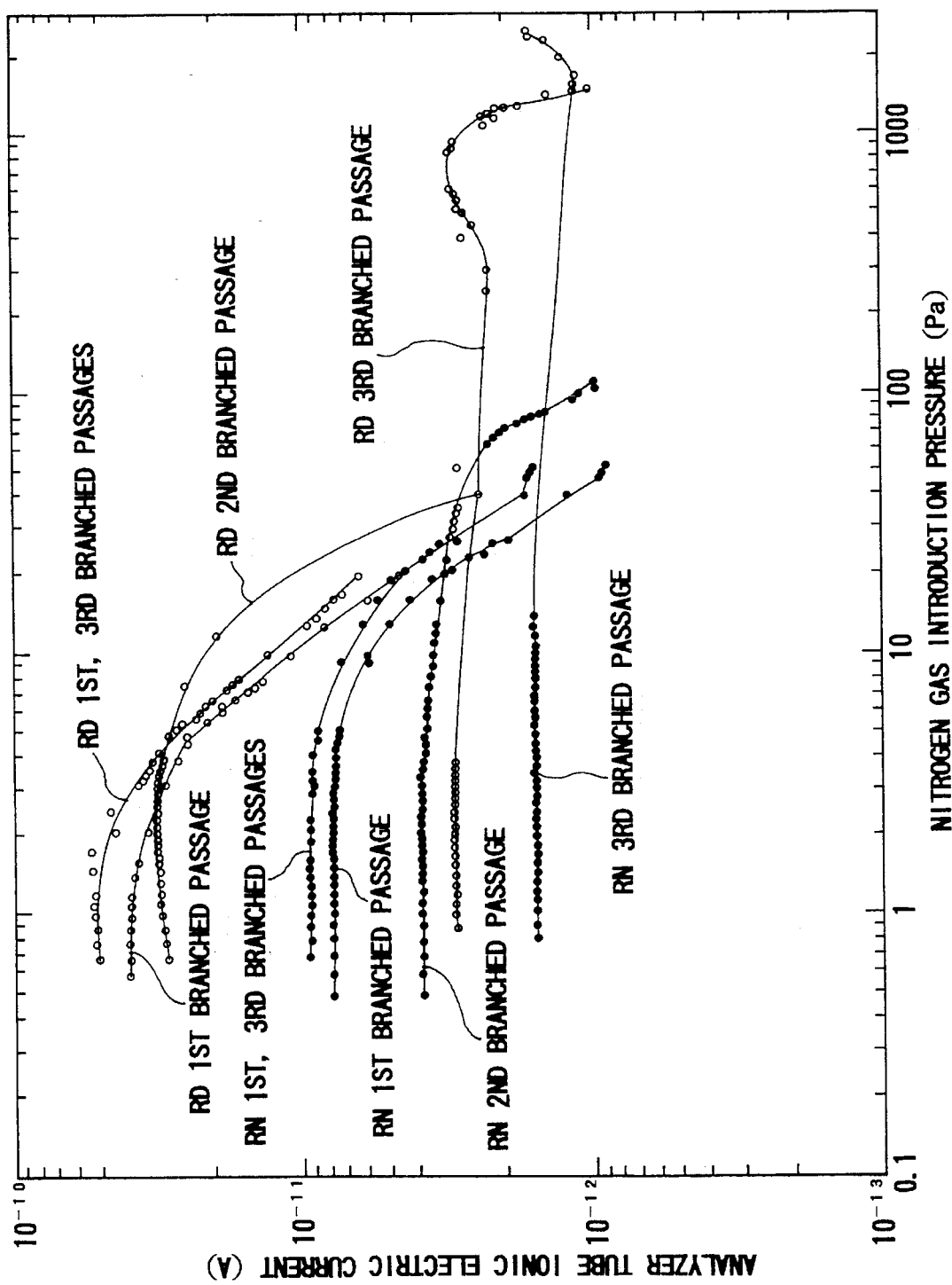
FIG. 9 is a diagram showing the relation between the rotation speed of the compound turbo-molecular pump and the service pressure at the connecting portion of each branched passage.

Further, there was sequentially carried out an operation of causing nitrogen gas to flow in each of the branched passages while causing a reference leak of $10^{-8}$ Pa.m$^3$/sec to flow therein to check the location of the transition point being measured by the helium gas, at which the exhaust speed of the compound turbo-molecular pump 2 varies. The results are as shown in FIG. 9. The ordinate of this figure represents a value of an ionic electric current when the reference leak of helium gas of $10^{-8}$ Pa. m$^3$/sec was measured in the analyzer tube 1, and the abscissa represents an introduction pressure of nitrogen gas. Each of the curves in this case happens to be the same as in FIG. 8, but it can be seen that there are respective transition points for respective branched passages. The left-upper side of the transition point of each of the curves is the service pressure (or the pressure that can be used) of each of the branched passages. The transition point becomes a set point value at the time when the gate valve is changed over by the controller 15.

Accordingly, if the rotation speed of the compound turbo-molecular pump 2 is changed, a wide range of leak detection can be carried out in the three branched passages. The number of branched passages needs not be limited to three but may be two or larger than three.

As explained hereinabove, according to the present invention, an auxiliary vacuum pump is connected to an analyzer tube via a compound turbo-molecular pump and a fore valve. The exhaust passage from the test port to which the object of inspection is connected is branched and each of the branched passages is connected to different positions of varying compression ratios of the compound turbo-molecular pump via a gate valve. Therefore, by alternately opening each of the branched passages, leak detection can be quickly carried out without being influenced by the volume of the object of inspection and the gas to be emitted therefrom and, further, a quick cleaning up can be made. The leak detection of a large number of objects of inspection can thus be efficiently made and a superior detection sensitivities can be obtained. It follows that the leak detection can be made even by an unexperienced operator. The construction of the detecting apparatus is also relatively simple and cheap in manufacturing. Further, by controlling the opening and closing of the gate valve in each of the branched passages in accordance with the indication of the vacuum gauge connected to the exhaust passage, the leak detection can be automatically made and its operation becomes easy.

It is readily apparent that the above-described leak detection apparatus using a compound turbo-molecular pump meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A leak detecting apparatus for connection to an object of inspection using a compound turbo-molecular vacuum pump having a plurality of ports corresponding to a plurality of positions with different compression ratios, comprising:

an analyzer tube;

an auxiliary vacuum pump such as a rotary pump connected to said analyzer tube by means of a passage with a compound turbo-molecular vacuum pump and a fore valve in between;

an exhaust passage extending from a test port to be connected to said object of inspection,
wherein said exhaust passage forms a manifold system that is branched into a plurality of branched passages, each of said branched passages being connected to a position of different compression ratio of said compound turbo-molecular pump, and
wherein a gate valve is disposed in each of said branched passages;

a vacuum gauge means, operably connected to said exhaust passage, for being in communication with each of said gate valves; and a controller means, operably connected to said gate valves connected to the positions of different compression ratios, for sequentially opening and closing said gate valves by a signal from said controller means in accordance with a change in pressure to be detected by said vacuum gauge means.

2. A leak detecting apparatus using a compound turbo-molecular pump according to claim 1, wherein said compound turbo-molecular pump is made up of any one of a multi-stage turbo molecular pump, an integral combination of a turbo molecular pump and a drag molecular pump, and an integral combination of a turbo molecular pump and a screw pump, and wherein a vent valve is connected to said exhaust passage.

3. A leak detecting apparatus using a compound turbo-molecular pump according to claim 1, wherein said compound turbo-molecular pump can be changed over in rotation speed.

4. A leak detecting apparatus for connection to an object of inspection using a compound turbo-molecular vacuum pump having a plurality of ports corresponding to a plurality of positions with different compression ratios, comprising:

an analyzer tube;

an auxiliary vacuum pump such as a rotary pump connected to said analyzer tube by means of a passage via a compound turbo-molecular vacuum pump and a fore valve in between, said auxiliary vacuum pump being capable of changeover in rotation speed;

an exhaust passage extending from a test port to be connected to an object of inspection; and a vacuum gauge connected to said exhaust passage, wherein said exhaust passage forms a manifold system that is branched into three passages of first branched passage, a second branched passage and a third branched passage;

a gate valve which is disposed in each of said branched passages, wherein said first branched passage is connected to a position of small compression ratio of said compound turbo-molecular pump, said third branched passage is connected to a position of largest compression ratio of said compound turbo-molecular pump, said second branched passage is connected to a position of an intermediate compression ratio, wherein said fore-valve and manifold system of three branched passages with three gate valves is operated such that only said third branched passage is opened when a pressure detected by said vacuum gauge is in a high pressure range, that only said second branched passage is opened when the pressure is in an intermediate pressure range, and that only said first branched passage is opened when the pressure is in a low pressure range.

* * * * *